US008600957B2

(12) United States Patent
Kobayashi et al.

(10) Patent No.: US 8,600,957 B2
(45) Date of Patent: Dec. 3, 2013

(54) MESH DATA CREATION METHOD

(75) Inventors: Motonari Kobayashi, Yokohama (JP);
Ichiro Okajima, Yokosuka (JP); Hiroshi Kawakami, Yokosuka (JP); Manhee Jo, Yokohama (JP); Toshihiro Suzuki, Yokohama (JP); Daisuke Ochi, Yokosuka (JP); Tomohiro Nagata, Tokyo (JP); Yuki Oyabu, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 111 days.

(21) Appl. No.: 13/258,073

(22) PCT Filed: Mar. 23, 2010

(86) PCT No.: PCT/JP2010/054969
§ 371 (c)(1),
(2), (4) Date: Nov. 10, 2011

(87) PCT Pub. No.: WO2010/116888
PCT Pub. Date: Oct. 14, 2010

(65) Prior Publication Data
US 2012/0066266 A1 Mar. 15, 2012

(30) Foreign Application Priority Data

Apr. 10, 2009 (JP) ................................ P2009-095781

(51) Int. Cl.
*G06F 17/30* (2006.01)
(52) U.S. Cl.
USPC ............ 707/693; 707/688; 345/420; 345/423
(58) Field of Classification Search
USPC ............................ 707/688, 693; 345/420, 423
See application file for complete search history.

(56) References Cited

U.S. PATENT DOCUMENTS 6,137,492 A * 10/2000 Hoppe ........................... 345/420
2005/0083328 A1 * 4/2005 Ueda et al. .................... 345/423
(Continued)

FOREIGN PATENT DOCUMENTS

JP 11 025292 1/1999
JP 2001 000055 1/2001
(Continued)

OTHER PUBLICATIONS

English translation of International Preliminary Report on Patentability and Written Opinion of the International Searching Authority mailed Nov. 24, 2011, in PCT/JP2010/054969.
(Continued)

*Primary Examiner* — Khanh Pham
(74) *Attorney, Agent, or Firm* — Oblon, Spivak, McClelland, Maier & Neustadt, L.L.P.

(57) ABSTRACT

Provided is a mesh data creation method allowing appropriate expression of population densities while making a balance between accuracy and granularity. In the mesh data creation method, when the number of samples in a region of reference mesh data with a predetermined size is not less than a threshold, divided mesh data is created by dividing the region of the reference mesh data. Namely, each portion with a high population density can be expressed by a fine region of mesh data and each portion with a low population density by a coarse region of mesh data. The above makes it feasible to prevent meshes from becoming too fine to ensure accuracy or, conversely, from becoming too coarse to maintain granularity, thereby resulting in failing to achieve a detailed grasp of population densities, and thus to achieve appropriate expression of population densities while making a balance between accuracy and granularity.

10 Claims, 14 Drawing Sheets

(56) References Cited

U.S. PATENT DOCUMENTS

| | | | |
|---|---|---|---|
| 2007/0182735 A1* | 8/2007 | Imai | 345/420 |
| 2010/0042364 A1* | 2/2010 | Nakamura et al. | 702/179 |
| 2010/0094597 A1* | 4/2010 | Blain et al. | 703/1 |

FOREIGN PATENT DOCUMENTS

| | | |
|---|---|---|
| JP | 2001 229186 | 8/2001 |
| JP | 2002 189834 | 7/2002 |
| JP | 2003 091620 | 3/2003 |
| JP | 2003 167881 | 6/2003 |

OTHER PUBLICATIONS

Notice of Reasons for Rejection issued Apr. 24, 2012 in Japanese Patent Application No. 2009-095781 (with English translation).

International Search Report Issued May 25, 2010 in PCT/JP10/054969 Filed Mar. 23, 2010.

* cited by examiner

MESH DATA CREATION METHOD

TECHNICAL FIELD

The present invention relates to a mesh data creation method.

BACKGROUND ART

A known conventional method to express population densities (distribution) is, for example, to divide a map into meshed regions and color-code the divided regions according to their respective population densities (e.g., cf. Patent Literature 1). The population density expression method of this kind is effective, for example, to cases where a large number of samples (complete survey) are targets, for example, like a census or the like.

CITATION LIST

Patent Literature

Patent Literature 1: Japanese Patent Application Laid-open No. 2001-229186

SUMMARY OF INVENTION

Technical Problem

However, the aforementioned conventional population density expression method had the problem as described below, because the size of each mesh was preliminarily set at a fixed value. Namely, when the mesh size was fixed as in the conventional method, the number of samples becomes too small to ensure necessary accuracy in places with a low population density if the necessary accuracy is ensured in places with a high population density. If the necessary accuracy is ensured in places with a low population density to the contrary, the mesh size becomes larger than necessary. In the places with a high population density, the mesh size was made larger than necessary though the necessary accuracy can be ensured even with smaller meshes, whereby it became infeasible to allow a detailed grasp of population densities in meshes. In other words, the conventional technology made the meshes too fine to ensure accuracy or, conversely, too coarse to maintain granularity, resulting in failing to achieve a detailed grasp of population densities. This can also be said that the conventional technology failed to make a balance between accuracy and granularity.

Therefore, the present invention has been accomplished in view of the above-described circumstances and it is an object of the present invention to provide a mesh data creation method allowing appropriate expression of population densities while making a balance between accuracy and granularity.

Solution to Problem

In order to solve the above problem, a mesh data creation method according to the present invention is a mesh data creation method to create mesh data for expression of population densities, comprising: a reference mesh data creation step of creating reference mesh data with a predetermined size; a location information acquisition step of acquiring location information contained in a region of the reference mesh data created in the reference mesh data creation step; a determination step of specifying a number of samples existing in the region of the reference mesh data, based on the location information acquired in the location information acquisition step, and determining whether the number of samples is not less than a preset threshold; and a mesh data creation step of creating divided mesh data by dividing the region of the reference mesh data, if it is determined in the determination step that the number of samples is not less than the threshold.

According to the mesh data creation method of the present invention as described above, the divided mesh data is created by dividing the region of the reference mesh data if the number of samples in the region of the reference mesh data with the predetermined size is not less than the threshold. Namely, each portion with a high population density can be expressed by a fine region of mesh data and each portion with a low population density by a coarse region of mesh data. Furthermore, since the region of the reference mesh data is divided if the number of samples is not less than the threshold, the regions are prevented from becoming larger than necessary and, particularly, each portion with a high population density can be expressed in detail. The above prevents the meshes from becoming too fine to ensure accuracy or, conversely, from becoming too coarse to maintain granularity, resulting in failing to achieve a detailed grasp of population densities, and makes it feasible to achieve appropriate expression of population densities while making a balance between accuracy and granularity. The mesh data is data of a meshed section for each display region.

Preferably, the method further comprises: a minimum size acceptance step of accepting a request to designate a minimum size of the region of the mesh data, from a user, and the mesh data creation step comprises creating the divided mesh data so that the region of the reference mesh data is prevented from becoming smaller than the minimum size requested by the user in the minimum size acceptance step.

If the number of samples existing in the region of mesh data is large, the size of the region of the mesh size can become extremely small. Therefore, the divided mesh data is created so as to prevent the region size from becoming smaller than the minimum size requested by the user, whereby appropriate display can be provided to the user.

Preferably, the method further comprises: a size acceptance step of accepting a request to designate a size of the region of the mesh data, from a user; and a duration calculation step of calculating a duration for acquisition of the location information necessary for achieving the size of the region requested by the user in the size acceptance step, and the location information acquisition step comprises acquiring the location information, according to the duration calculated in the duration calculation step.

In this case, the duration for acquisition of the location information necessary for achieving the size of the region desired by the user is calculated, and the mesh data is created based on the location information acquired according to this duration, which enables display according to user's needs.

Preferably, the method further comprises: a duration acceptance step of accepting a request to designate a duration for acquisition of the location information, from a user, and the location information acquisition step comprises acquiring the location information, according to the duration requested by the user in the duration acceptance step.

In this case, since the mesh data is created based on the location information acquired according to the duration for acquisition of the location information designated by the user, it is feasible to provide display according to the duration desired by the user.

Preferably, the method further comprises: a size determination step of comparing plural pieces of mesh data created based on the location information in different time zones and determining whether sizes of respective regions of the plural pieces of mesh data at an identical location are identical; and a size adjustment step of, if it is determined in the size determination step that the sizes of the respective regions are not identical, adjusting the sizes of the respective regions of the plural pieces of mesh data so as to equalize the sizes of the respective regions of the mesh data in the different time zones.

For continuous display of mesh data created at different times (animation), since the numbers of samples of location information acquired at the respective times are different, the sizes of regions of mesh data become different depending upon the times and it becomes difficult to grasp changes of population densities at a glance. Then the sizes of regions are adjusted to equalize the sizes of the respective regions of mesh data at the same location, in the mesh data created at different times, whereby the user can grasp changes of population densities at a glance in continuous display of data at the plural times.

Preferably, the method further comprises: a size adjustment step of acquiring plural pieces of mesh data created based on the location information in different time zones, and adjusting sizes of respective regions of the plural pieces of mesh data so that the sizes of the respective regions of the plural pieces of mesh data at an identical location become a predetermined size preliminarily set.

In the case of continuous display of mesh data created at different times (animation), since the numbers of samples of location information acquired at the respective times are different, the sizes of regions of mesh data are different depending upon the times and it can be difficult to grasp changes of population densities at a glance. Therefore, the sizes of regions are adjusted so that the sizes of the respective regions of mesh data at the same location become the preset predetermined size, in the mesh data created at the different times, whereby the user can grasp changes of population densities at a glance in continuous display of data at the plural times.

Another mesh data creation method according to the present invention is a mesh data creation method to create mesh data for expression of population densities, comprising: a reference mesh data creation step of creating reference mesh data with a predetermined size; a sector information acquisition step of acquiring sector information indicative of locations of sectors in a region of the reference mesh data created in the reference mesh data creation step; a determination step of specifying a number of sectors existing in the region of the reference mesh data, based on the sector information acquired in the sector information acquisition step, and determining whether the number of sectors is not less than a preset threshold; and a mesh data creation step of creating divided mesh data by dividing the region of the reference mesh data, if it is determined in the determination step that the number of sectors is not less than the threshold.

According to this mesh data creation method of the present invention, the divided mesh data is created by dividing the region of the reference mesh data if the number of samples in the region of the reference mesh data with the predetermined size is not less than the threshold. Namely, each portion with a large number of sectors can be expressed by a fine region of mesh data and each portion with a small number of sectors by a coarse region of mesh data. Since the region of the reference mesh data is divided if the number of sectors is not less than the threshold, the regions are prevented from becoming larger than necessary and, particularly, each portion with a large number of sectors can be expressed in detail. The above prevents the meshes from becoming too fine to ensure accuracy or, conversely, from becoming too coarse to maintain granularity, resulting in failing to achieve a detailed grasp of densities of sectors, and makes it feasible to achieve appropriate expression of densities of sectors while making a balance between accuracy and granularity.

Preferably, the method further comprises: a conversion step of converting population information in sector units to population information in region units of the mesh data, according to an area ratio of overlap between a sector region indicated in the sector information with population information and the region of the mesh data.

In this case, the mesh data can suitably reflect the population information of the sector information. A sector region is a region obtained by dividing cells of base stations by predetermined angles.

Advantageous Effect of Invention

The present invention allows appropriate expression of population densities while making a balance between accuracy and granularity.

DESCRIPTION OF EMBODIMENTS

The preferred embodiments of the mesh data creation method according to the present invention will be described below in detail with reference to the accompanying drawings. In the description of the drawings the same elements will be denoted by the same reference signs, without redundant description.

First Embodiment

First, the mesh data creation method according to the first embodiment of the present invention will be described. The mesh data creation method according to the present embodiment is substantialized by a mesh data creation system. This mesh data creation system creates mesh data by carrying out a mapping process on a map, based on location information (location point data) of mobile devices (cell phones) acquired by a communication system. Therefore, the communication system will be described first.

Figure 1:
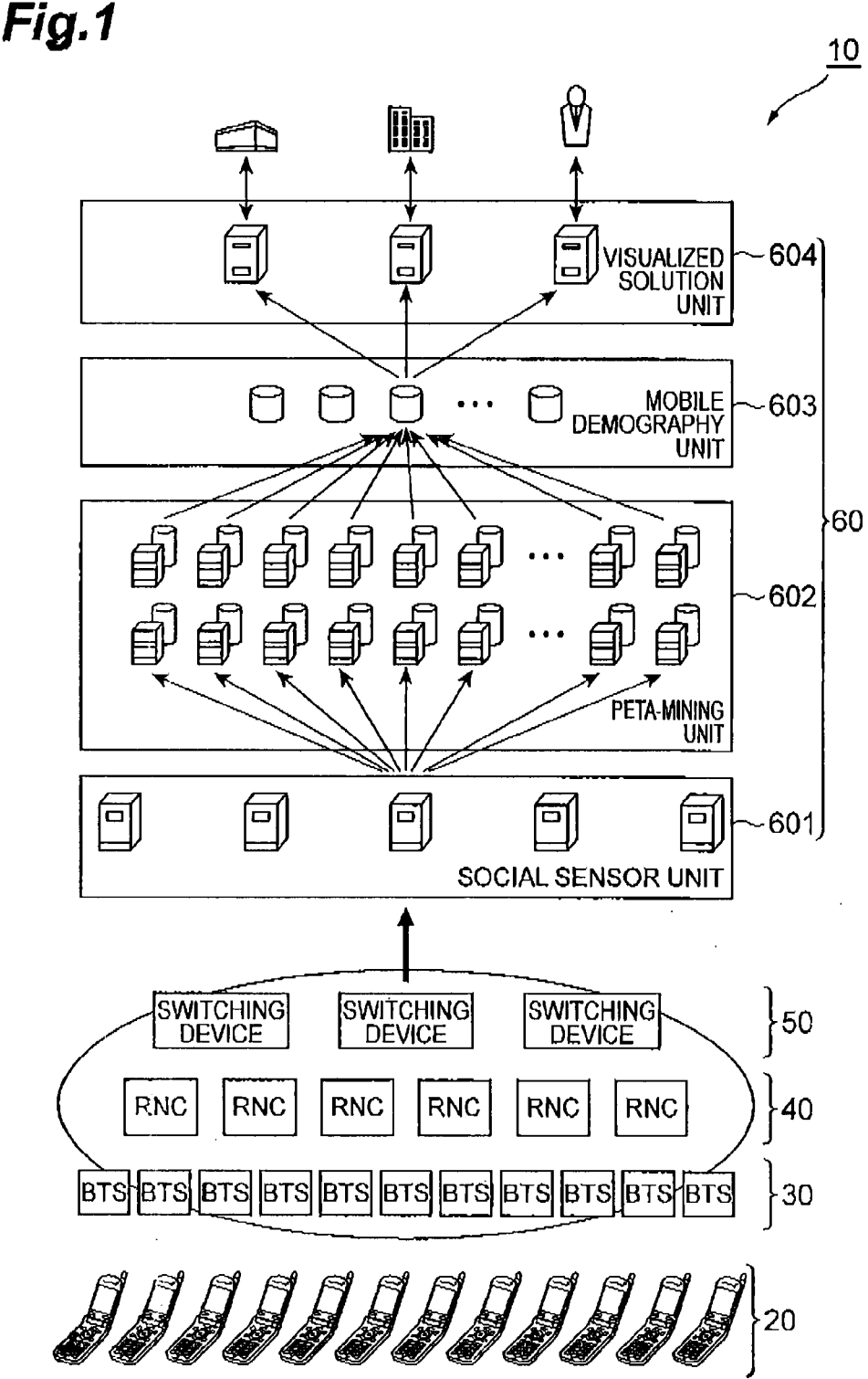
FIG. 1 is a drawing showing a schematic configuration of a communication system.

FIG. 1 is a drawing showing a schematic configuration of the communication system. As shown in the same drawing, the communication system 10 is configured including mobile devices 20, BTSs (base stations) 30, RNCs (radio network controllers) 40, switching devices 50, and a management center 60. This management center 60 is composed of a social sensor unit 601, a peta-mining unit 602, a mobile demography unit 603, and a visualized solution unit 604.

The switching devices 50 collect the location information of mobile devices 20 via BTSs 30 and RNCs 40. During execution of communication connection with a mobile device 20, RNC 40 can measure the location of the mobile device 20, using a delay value in an RRC connection request signal. Switching device 50 can receive the location information of mobile device 20 measured in this way, when the mobile device 20 executes communication connection. The switching device 50 stores the received location information and outputs the thus collected location information to the management center 60 at predetermined timing or in response to a request from the management center 60. In general, there are approximately a thousand RNCs 40, which are arranged across the whole country of Japan. On the other hand, approximately three hundred switching devices 50 are arranged in Japan.

The management center 60, as described above, is configured including the social sensor unit 601, peta-mining unit 602, mobile demography unit 603, and visualized solution unit 604 and each unit performs statistical processing using the location information of mobile devices 20.

The social sensor unit 601 consists of server devices to collect data containing the location information of mobile devices 20 and other information from each switching device 50. This social sensor unit 601 is configured so that it can receive data periodically output from the switching devices 50, or it can request the switching devices 50 to transmit data in accordance with timing preliminarily set in the social sensor unit 601.

The peta-mining unit 602 consists of server devices to convert data received from the social sensor unit 601, into a predetermined data format. For example, the peta-mining unit 602 performs a sorting process with user IDs as key or a sorting process for each area.

The mobile demography unit 603 consists of server devices to perform a tallying process for data processed in the peta-mining unit 602, i.e., a counting process in each item. For example, the mobile demography unit 603 can count the number of users located in a certain area, or tally a location distribution.

The visualized solution unit 604 consists of server devices to perform a process of visualizing data obtained by the tallying process in the mobile demography unit 603. The visualized solution unit 604 can perform a process of mapping tallied data on a map. Data processed in this visualized solution unit 604 is provided in accordance with a request from user terminal 2 (described later) of an enterprise, a public agency, or an individual to be utilized for shop development, a road traffic survey, countermeasures against disasters, environmental countermeasures, and so on. The information resulting from the statistical processing as described above is processed so as not to be able to specify individuals or others, in order to avoid violation of privacy, as a matter of course.

Each of the social sensor unit 601, peta-mining unit 602, mobile demography unit 603, and visualized solution unit 604 is composed of server devices as described above and, although illustration is omitted, it is needless to mention that each device is provided with a basic configuration of an ordinary information processing unit (i.e., CPU, RAM, ROM, input devices such as a keyboard and a mouse, a communication device to perform communication with the outside, a memory device to store information, and an output device such as a display or a printer). The below-described user terminal 2 is also provided with the basic configuration of the ordinary information processing device as the server device is.

Figure 2:
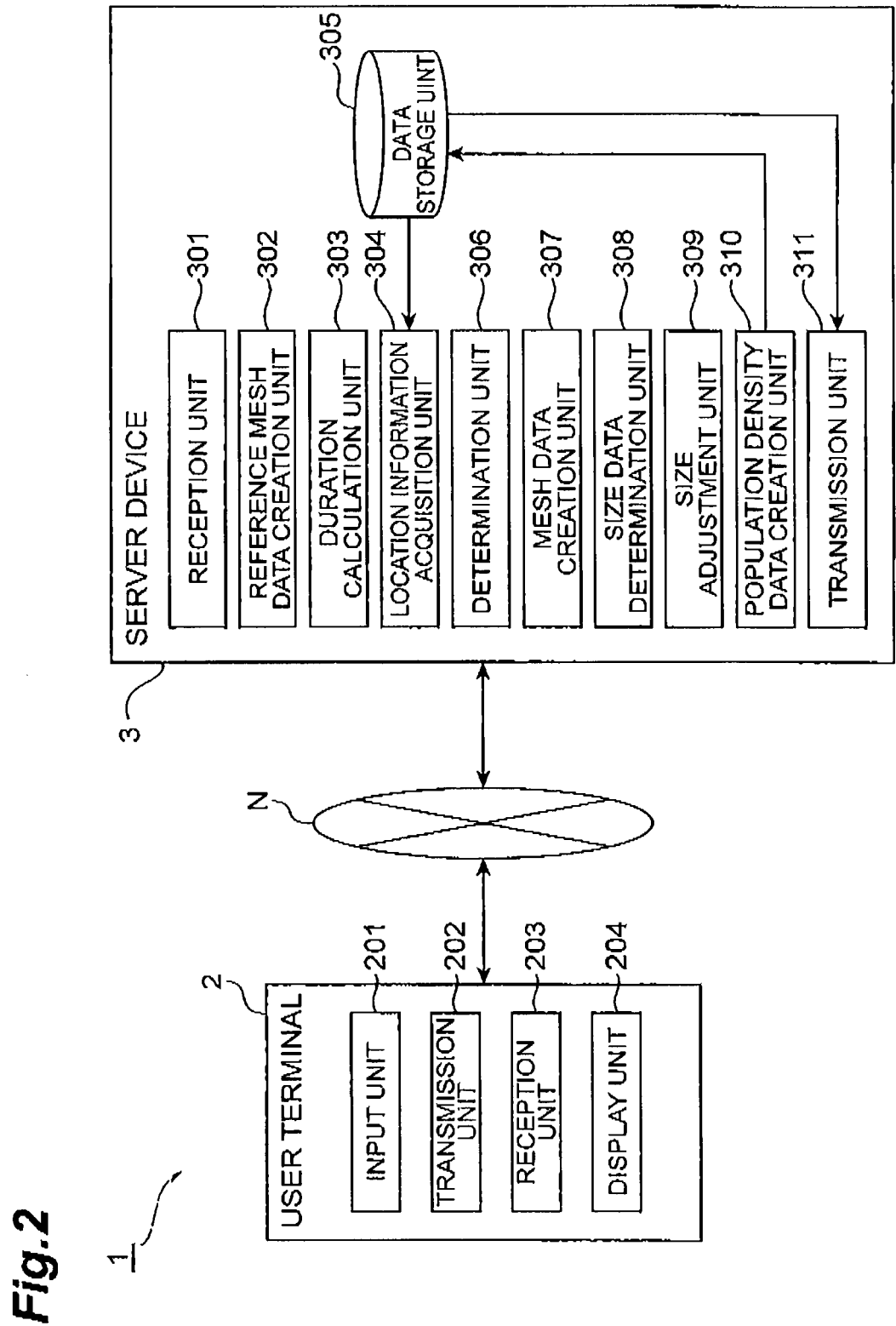
FIG. 2 is a drawing showing a schematic configuration of a mesh data creation system.

The following will describe the mesh data creation system. FIG. 2 is a drawing showing a schematic configuration of the mesh data creation system. As shown in FIG. 2, the mesh data creation system 1 is configured including user terminal 2 and server device 3. The user terminal 2 and server device 3 are connected in a communicable state with each other through a communication network N.

The user terminal 2 is a terminal that requests the server device 3 to provide information about population densities, based on a user's operation, and that receives and displays population density data transmitted from the server device 3 in response to this request. The user terminal 2 is, for example, a personal computer or a mobile terminal operated by an enterprise, a public agency, or an individual as described above.

The server device 3 is a device that has functions to create mesh data in response to an information request from the user terminal 2 and to transmit population density data resulting from mapping of this mesh data and population data onto map data, to the user terminal 2. The server device 3 corresponds to the aforementioned visualized solution unit 604.

Next, the user terminal 2 will be described in detail. The user terminal 2 is functionally configured with an input unit 201, a transmission unit 202, a reception unit 203, and a display unit 204.

The input unit 201 is a unit that accepts an operation from the user. The input unit 201 accepts an operation from the user, creates population density display request information according to the user's input operation, and outputs this population density display request information to the transmission unit 202. The population density display request information created by the input unit 201 also contains minimum size designation information to designate a minimum mesh size of mesh regions in display of population densities, size designation information to designate a mesh size of mesh regions, duration designation information to designate a duration for acquisition of location information, continuous display request information to request continuous display of population density data, and so on.

The transmission unit 202 is a unit that, when receiving the population density display request information output from the input unit 201, transmits this population density display request information to the server device 3.

The reception unit 203 is a unit that receives population density data transmitted from the server device 3 in response to the transmission of the population density display request information from the transmission unit 202. The reception unit 203 outputs the received population density data to the display unit 204.

The display unit 204 is, for example, a display and is a unit that, when receiving the population density data output from the reception unit 203, performs display of an image according to this population density data. The details of the image displayed on the display unit 204 will be described later.

Next, the server device 3 will be described in detail. The server device 3 is functionally provided with a reception unit 301, a reference mesh data creation unit 302, a duration calculation unit 303, a location information acquisition unit 304, a data storage unit 305, a determination unit 306, a mesh data creation unit 307, a size determination unit 308, a size adjustment unit 309, a population density data creation unit 310, and a transmission unit 311.

The reception unit 301 is a unit that receives the population density display request information transmitted from the user terminal 2. The reception unit 301 outputs the received population density display request information to the reference mesh data creation unit 302, duration calculation unit 303, location information acquisition unit 304, and size determination unit 308.

The reference mesh data creation unit 302 is a unit that, when receiving the population density display request information from the reception unit 301, creates reference mesh data. This reference mesh data is data with a region of a nearly square shape being a meshed section and having a predetermined size. The reference mesh data creation unit 302 creates the reference mesh data as many as the number of regions subjected to creation of population density data. The reference mesh data creation unit 302 outputs the created reference mesh data to the determination unit 306 and the mesh data creation unit 307.

The duration calculation unit 303 is a unit that, when the population density display request information output from the reception unit 301 contains the size designation information, calculates a minimum duration for acquisition of location information necessary for realizing the mesh size of mesh regions indicated by the size designation information. The duration calculation unit 303 calculates the duration necessary for acquisition of location information, by detecting the mesh size of mesh regions of mesh data created by the below-described mesh data creation unit 307, and the mesh size of mesh regions indicated by the size designation information, and comparing them. The duration calculation unit 303 outputs duration information indicative of the calculated duration to the location information acquisition unit 304.

The location information acquisition unit 304 is a unit that acquires location information. When the location information acquisition unit 304 receives the population density display request information output from the reception unit 301, it acquires the location information according to this population density display request information from the data storage unit 305. When the duration information is contained in the population density display request information output from the reception unit 301, or when the location information acquisition unit 304 receives the duration information output from the duration calculation unit 303, it acquires the location information according to the duration information. Specifically, the location information acquisition unit 304 acquires the location information, by performing a process of extracting the location information corresponding to times according to the duration information from the location information stored in the data storage unit 305. The location information acquisition unit 304 outputs the acquired location information to the determination unit 306 and the population density data creation unit 310.

The data storage unit 305 is a unit that stores the location information as described above. The data storage unit 305 stores the location information of mobile devices acquired by the communication system 10. Furthermore, the data storage unit 305 stores the population density data created by the below-described population density data creation unit 310.

The determination unit 306 is a unit that receives the reference mesh data output from the reference mesh data creation unit 302 and that, when receiving the location information output from the location information acquisition unit 304, specifies and counts the number of samples based on the location information and determines whether this number of samples is not less than a threshold in a region of reference mesh data. The threshold is set, for example, at 400. When the determination unit 306 determines that the number of samples is not less than the threshold, it outputs division instruction information to instruct division of the reference mesh data region, to the mesh data creation unit 307.

Figure 3:
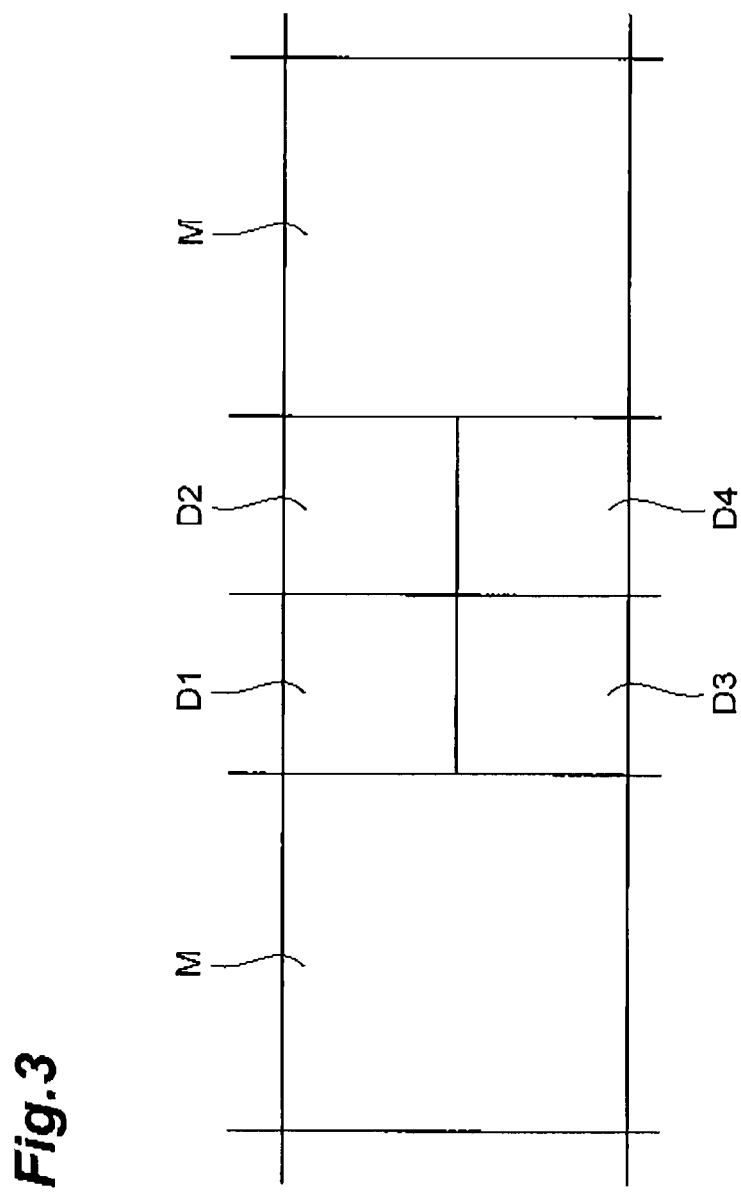
FIG. 3 is a drawing showing divided mesh data.

The mesh data creation unit 307 is a unit that creates divided mesh data, based on the reference mesh data created by the reference mesh data creation unit 302. When the mesh data creation unit 307 receives the division instruction information output from the determination unit 306, it creates the divided mesh data by dividing the reference mesh data region on the basis of this division instruction information. Specifically, this operation will be described with reference to FIG. 3. FIG. 3 is a drawing showing divided mesh data. As shown in the same drawing, the mesh data creation unit 307 creates divided mesh data D1-D4, for example, by quartering a mesh region M of reference mesh data. When the minimum size designation information is contained in the population density display request information output from the reception unit 301, the mesh data creation unit 307 creates the divided mesh data so that the mesh regions of divided mesh data can be larger than the size of mesh regions designated by the minimum size designation information. The mesh data creation unit 307 outputs the created divided mesh data to the population density data creation unit 310. The number of divisions of mesh data is optionally set.

The size determination unit 308 is a unit that, when the continuous display request information is contained in the population density display request information output from the reception unit 301, i.e., when the user requests continuous display (animation) of population density data, compares plural pieces of mesh data created based on the location information in different time zones and determines whether sizes of respective areas of the plural pieces of mesh data at the same location (identical latitude and longitude) are the same. Specifically, when the size determination unit 308 determines that mesh sizes of respective mesh regions of the plural pieces of mesh data at the same location are not the same, in the population density data in different time zones created by the population density data creation unit 310 and stored in the data storage unit 305, it outputs determination information indicative of the determination result to the size adjustment unit 309.

The size adjustment unit 309 is a unit that adjusts mesh sizes of mesh regions of mesh data. When the size adjustment unit 309 receives the determination information output from the size determination unit 308, it adjusts sizes of respective regions of plural pieces of mesh data so that the mesh sizes of respective mesh regions of the mesh data in different time zones become identical. Specifically, the size adjustment unit 309 acquires respective pieces of mesh data from plural pieces of population density data and adjusts mesh sizes of respective mesh regions so that the mesh sizes of mesh regions of the respective pieces of mesh data in a display section become identical in all the time zones to be displayed. The size adjustment unit 309 outputs the resultant mesh data after the size adjustment to the population density data creation unit 310.

The population density data creation unit 310 is a unit that creates population density data. The population density data creation unit 310 creates the population density data, based on the reference mesh data output from the reference mesh data creation unit 302 and the location information output from the location information acquisition unit 304. When the population density data creation unit 310 receives the divided mesh data output from the mesh data creation unit 307, it creates the population density data, based on this divided mesh data and the location information. More specifically, the population density data creation unit 310 creates the population density data, by mapping the reference mesh data or divided mesh data and the location information (population data) corresponding to the mesh data onto the map data. When the population density data creation unit 310 receives output of mesh data from the size adjustment unit 309, it creates the population density data based on the mesh data. The population density data creation unit 310 outputs the created population density data to the transmission unit 311. The population density data creation unit 310 also outputs the created population density data to the data storage unit 305.

When the transmission unit 311 receives the population density data output from the population density data creation unit 310, it transmits this population density data to the user terminal 2. Furthermore, the transmission unit 311 transmits the population density data stored in the data storage unit 305, to the user terminal 2.

Figure 4:
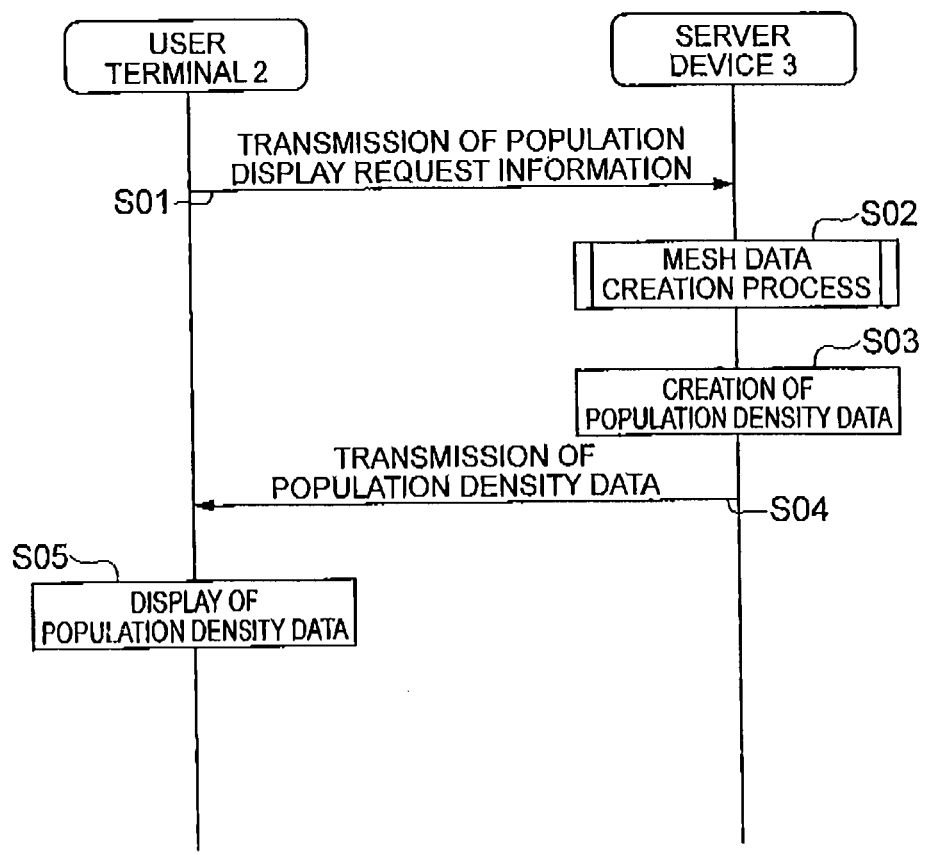
FIG. 4 is a sequence showing an example of operation of the mesh data creation system.
Figure 5:
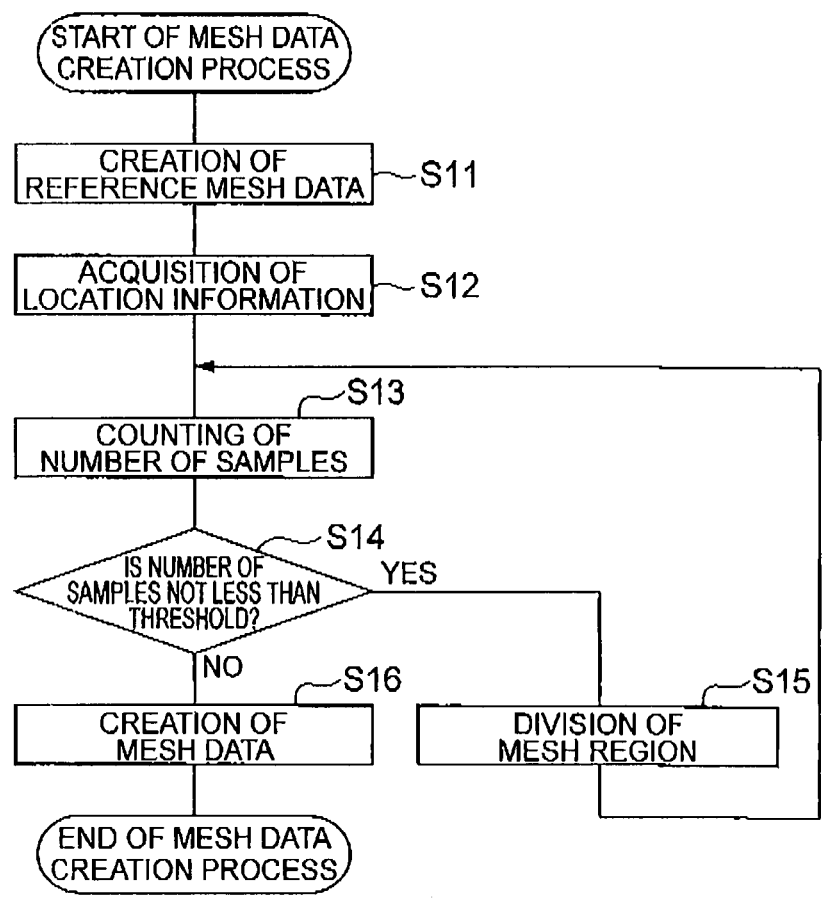
FIG. 5 is a flowchart showing a mesh data creation process.

The below will describe the operation carried out by the mesh data creation system 1, with reference to FIGS. 4 and 5. FIG. 4 is a sequence showing an example of the operation of the mesh data creation system 1. FIG. 5 is a flowchart showing a mesh data creation process. The below will describe a mode in which population density data is created after a request of population density display from a user.

As shown in FIG. 4, first, the user terminal 2 sends the population density display request information to request display of population densities, to the server device 3 (step S01). The server device 3, receiving this population display request information, carries out the mesh data creation process (step S02). The mesh data creation process will be described with reference to FIG. 5.

With a start of execution of the mesh data creation process, as shown in FIG. 5, the reference mesh data creation unit 302 first creates the reference mesh data (step S11). Then the location information acquisition unit 304 acquires the location information included in a mesh region of the reference mesh data created (step S12). With acquisition of the location information, the number of samples existing in the mesh region of the reference mesh data is specified and counted based on this location information (step S13), and the determination unit 306 determines whether this number of samples is not less than the threshold (e.g., 400) (step S14). When the number of samples is determined to be not less than the threshold, the flow proceeds to step S15. On the other hand, when the number of samples is determined to be less than the threshold, the reference mesh data is created as mesh data (step S16).

In step S15, the mesh data creation unit 307 creates divided mesh data by dividing the mesh region of reference mesh data. The mesh data creation process is carried out as described above.

Referring back to FIG. 4, the server device 3 creates the population density data, based on the mesh data created by the mesh data creation process (step S03). Then the transmission unit 311 transmits the created population density data from the server device 3 to the user terminal 2 (step S04). In the user terminal 2 receiving this population density data, an image according to the population density data is displayed on the display unit (step S05). It is also possible to adopt a scheme in which when the user terminal 2 transmits the population density display request information to the server device 3, the server device 3 transmits the population density data preliminarily created and stored in the data storage unit 305, which is not illustrated in FIG. 4.

Figure 6:
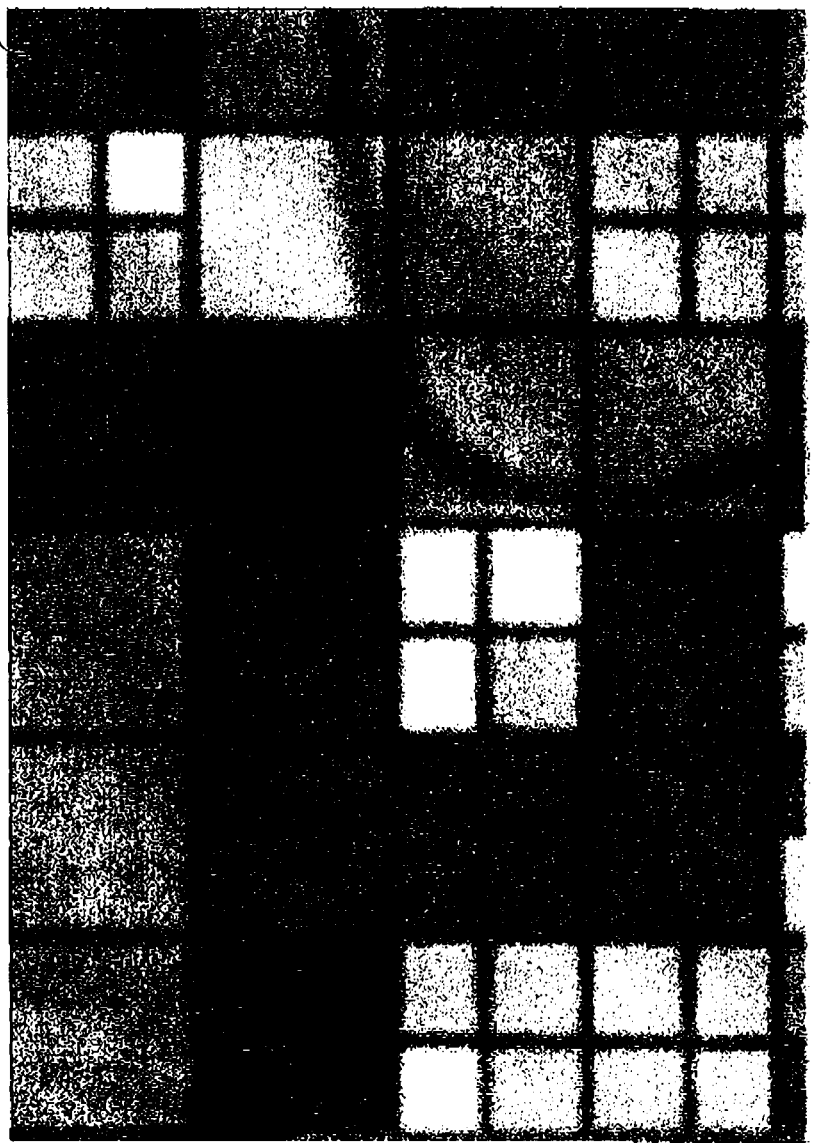
FIG. 6 is a drawing showing an example of population density data displayed at a user terminal.

FIG. 6 is a drawing showing an example of population density data displayed in the user terminal 2. As shown in the same drawing, the image based on the population density data displayed on the display unit 204 of the user terminal 2 shows that mesh regions of plural pieces of mesh data created based on the numbers of samples are mapped on a map. In the mesh regions, population densities obtained based on the location information are indicated by color differences or shades of color. In FIG. 6, the population density is high in each mesh region with the small size and the population density is low in each mesh region with the large size.

Figure 7:
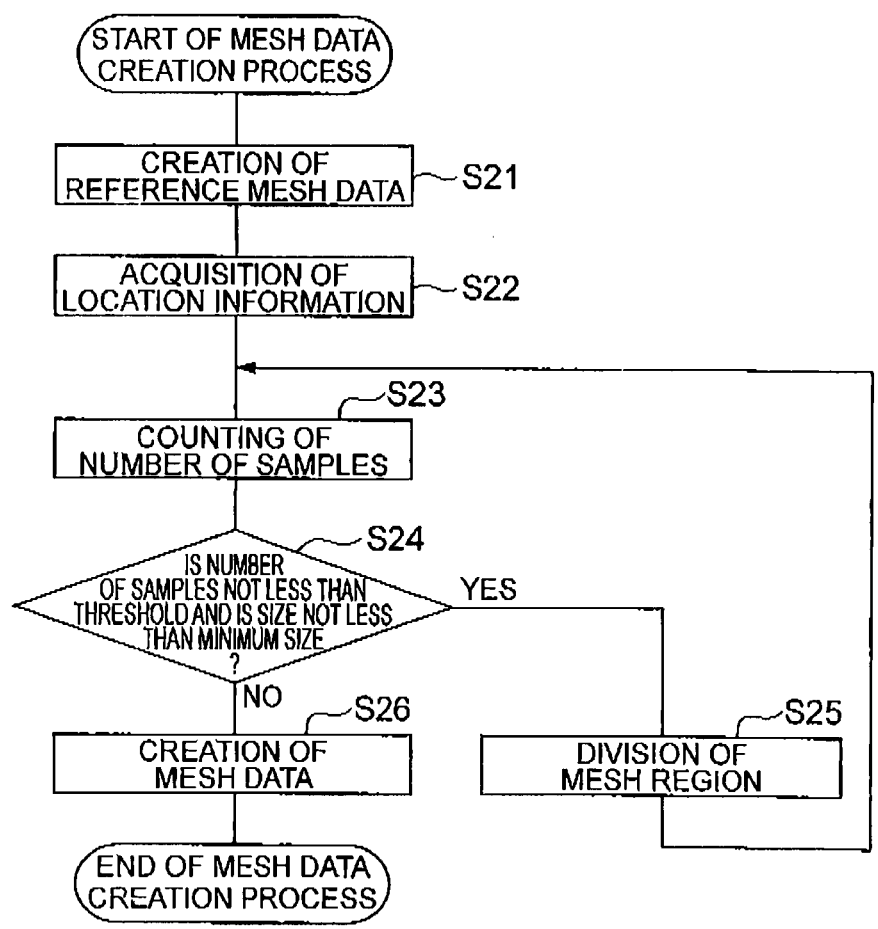
FIG. 7 is a flowchart showing a mesh data creation process in a situation where a minimum mesh size is designated.

The below will describe, with reference to FIG. 7, the mesh data creation method in a situation where the user designates the minimum size of mesh regions, i.e., where the minimum size designation information is contained in the population density display request information in step S01 in FIG. 4. FIG. 7 is a flowchart showing the mesh data creation process in the case where the minimum mesh size is designated. The same processes (steps S21 to S23) as those in the flowchart of FIG. 5 will be omitted from the description.

As shown in FIG. 7, in step S24, the number of samples existing in the mesh region of reference mesh data is specified based on the location information and the determination unit 306 determines whether this number of samples is not less than the threshold (e.g., 400) and whether the mesh size of the mesh region of mesh data is not less than the minimum mesh size. When it is determined that the number of samples is not less than the threshold and that the mesh size is not less than the minimum mesh size, the mesh data creation unit 307 creates divided mesh data by dividing the mesh region of reference mesh data (step S25) and the flow returns to the process of step S23. On the other hand, when it is not determined that the number of samples is not less than the threshold and that the mesh size is not less than the minimum mesh size, the mesh data is created (step S26).

Figure 8:
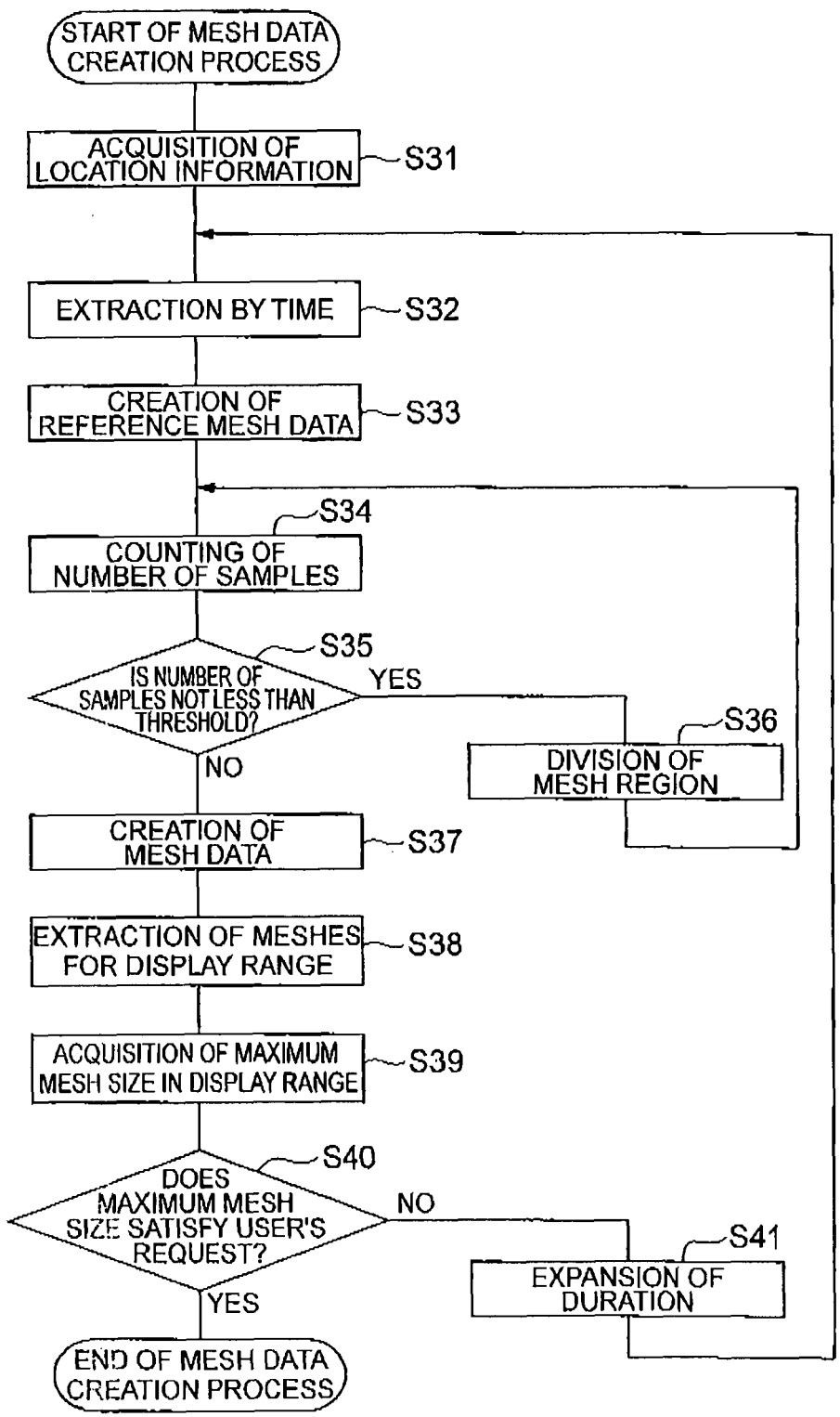
FIG. 8 is a flowchart showing a mesh data creation process in a situation where a mesh size is designated.

The below will describe the mesh data creation method in a situation where the user designates the mesh size of mesh regions in the mesh data, i.e., where the size designation information is contained in the population density display information in step S01 in FIG. 4, with reference to FIG. 8. FIG. 8 is a flowchart showing the mesh data creation process in the case where the mesh size is designated.

As shown in FIG. 8, the location information acquisition unit 304 first acquires the location information (step S31). Next, extraction by time is carried out with the acquired location information. Namely, only location information corresponding to a preset duration is extracted from the location information acquired in step S31 (step S32).

Subsequently, the reference mesh data creation unit 302 creates the reference mesh data (step S33). Then the number of samples existing in the mesh region of reference mesh data is specified and counted, based on the location information contained in the region of reference mesh data created (step S34) and the determination unit 306 determines whether this number of samples is not less than the threshold (e.g., 400) (step S35). When the number of samples is determined to be not less than the threshold, the mesh data creation unit 307 creates the divided mesh data by dividing the mesh region of reference mesh data (step S36) and the flow returns to the process of step S34. When the number of samples is determined to be less than the threshold, the mesh data is created (step S37).

After the mesh data is created in step S37, mesh regions of mesh data in a display range are cut out therefrom (step S38). The display range represents a display range in the display unit 204 of the user terminal 2. Then a maximum mesh size in the display range is acquired among the mesh regions thus cut out (step S39) and it is determined whether this maximum mesh size satisfies the requested mesh size designated by the user (step S40). When the maximum mesh size is determined to satisfy the user's requested mesh size, the processing is terminated. On the other hand, when the maximum mesh size is determined not to satisfy the user's requested mesh size, the duration is expanded (step S41) and with the expanded duration the flow returns to the process of step S32.

Figure 9:
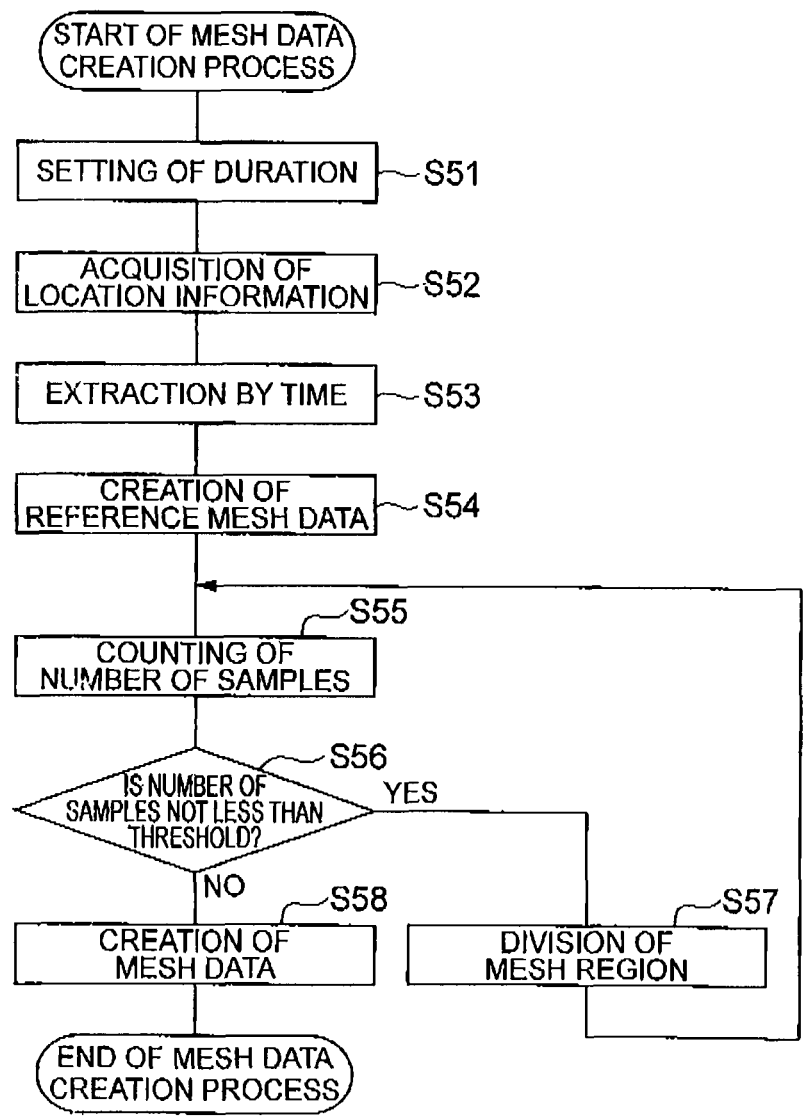
FIG. 9 is a flowchart showing a mesh data creation process in a situation where a duration to acquire location information is designated.

The below will describe the mesh data creation method in a situation where the user designates a duration to acquire the location information, i.e., where the duration designation information is contained in the population density display information in step S01 in FIG. 4, with reference to FIG. 9. FIG. 9 is a flowchart showing the mesh creation process in the case where the duration to acquire location information is designated.

As shown in FIG. 9, a duration is first set based on the duration information designated by the user (step S51). Next, the location information acquisition unit 304 acquires the location information (step S52). Then extraction by time is carried out with the acquired location information. Namely, only the location information corresponding to the duration set in step S51 is extracted from the location information acquired in step S52 (step S53).

Subsequently, the reference mesh data creation unit 302 creates the reference mesh data (step S54). The number of samples existing in the mesh region of reference mesh data is specified and counted, based on the location information in the mesh region of the created reference mesh data (step S55) and then the determination unit 306 determines whether this number of samples is not less than the threshold (e.g., 400) (step S56).

When the number of samples is determined to be not less than the threshold, the mesh data creation unit 307 creates divided mesh data by dividing the mesh region of reference mesh data (step S57) and the flow returns to the process of step S55. When the number of samples is determined to be less than the threshold, the mesh data is created (step S58). The created mesh data may be adjusted so that the mesh size of mesh regions becomes, for example, a maximum mesh size of mesh regions of mesh data in the display range.

Figure 10:
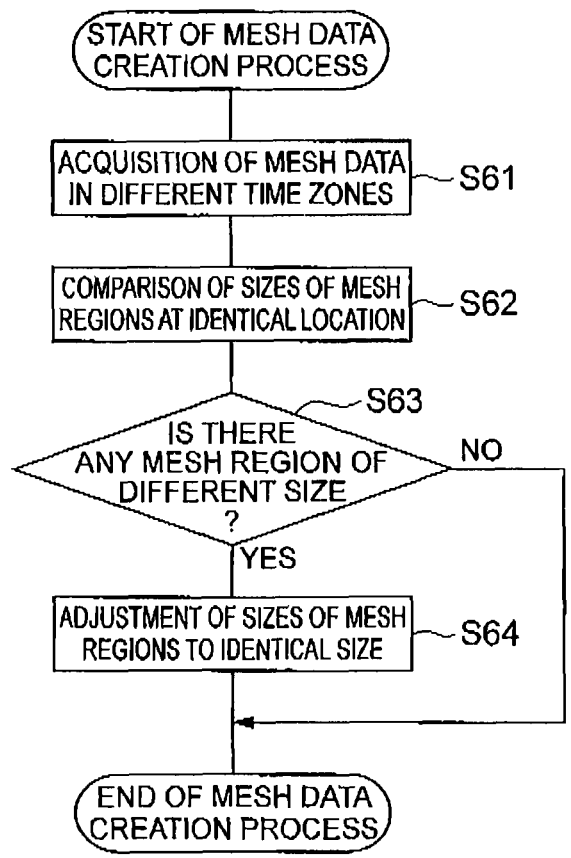
FIG. 10 is a flowchart showing a mesh data creation process in a situation where continuous display of population density data is requested.

The below will describe the mesh data creation method in a situation where the user requests continuous display of population density data, i.e., where a continuous display request is contained in the population density display information in step S01 in FIG. 4, with reference to FIG. 10. FIG. 10 is a flowchart showing the mesh data creation process in the case where the continuous display of population density data is requested. It is assumed in the description below that the population density data created by the population density data creation unit 310 is preliminarily stored in the data storage unit 305.

As shown in FIG. 10, pieces of population density data in different time zones are first acquired from the data storage unit 305 and mesh data is acquired from each piece of population density data (step S61). Next, mesh sizes of respective mesh regions at an identical location are compared among the pieces of mesh data thus acquired (step S62). Then the size determination unit 308 determines whether there is any mesh region of a different mesh size at the same location (step S63).

When it is determined that there is a mesh region of different size at the same location, the size adjustment unit 309 adjusts the mesh size so that the mesh size of the corresponding mesh region becomes the same mesh size as that of the other mesh regions (step S64). On the other hand, when it is determined that there is no mesh region of different mesh size at the same location, the processing is terminated. The mesh size of the mesh region may also be adjusted so that the mesh size becomes the maximum mesh size in the display range.

In the mesh data creation method in the mesh data creation system 1 according to the present embodiment, as described above, the divided mesh data obtained by dividing the reference mesh data region is created if the number of samples in the reference mesh data region with the predetermined size is not less than the threshold. Namely, each portion with a high population density can be expressed by a fine region of mesh data, and each portion with a low population density by a coarse region of mesh data. Furthermore, since the reference mesh data region is divided if the number of samples is not less than the threshold, the regions are kept from becoming larger than necessary and, particularly, each portion with a high population density can be expressed in detail. As described above, it is feasible to prevent the meshes from becoming too fine to ensure accuracy or, conversely, from becoming too coarse to maintain granularity, thereby resulting in failing to achieve a detailed grasp of population densities, and thus to achieve appropriate expression of population densities while making a balance between accuracy and granularity.

In the present embodiment, designation of the minimum mesh size of mesh regions of mesh data is accepted from the user and the mesh data is created so that the mesh size of each mesh region becomes larger than the designated minimum mesh size. If the number of samples existing in a region of mesh data is large, the mesh size of the mesh data region might become extremely small. Therefore, the divided mesh data is created so that the mesh size can be larger than the minimum mesh size requested by the user, whereby appropriate display can be provided to the user.

In the present embodiment, the duration for acquisition of location information necessary for achieving the size of regions desired by the user is calculated and the mesh data is created based on the location information acquired according to this duration; therefore, it is feasible to provide display according to user's needs.

In the present embodiment, since the mesh data is created based on the location information acquired according to the duration for acquisition of location information designated by the user, it is feasible to provide display according to the duration desired by the user.

Incidentally, in the case where pieces of mesh data created at different times are continuously displayed (animation), the numbers of samples of location information acquired at the respective times become different from each other and thus the mesh sizes of mesh data regions become different depending upon the times; therefore, it becomes difficult to capture changes of population densities at a glance. In the present embodiment, therefore, the mesh sizes of mesh regions are adjusted so that the mesh sizes of the respective mesh regions of mesh data at the same location become identical, in the mesh data created at the different times, whereby changes of population densities can be captured at a glance in the continuous display of the data at different times.

It is noted that the present invention is by no means limited to the above embodiment. For example, in addition to the above embodiment, it is also possible to adopt a method of creating and displaying the mesh data all in the same mesh size of mesh regions of the mesh data in the display range. Specifically, when the population density request information transmitted from the user terminal 2 contains information to designate the same mesh size for all the mesh sizes of mesh regions, the population density data stored in the data storage unit 305 is acquired and the mesh data is adjusted so that all the mesh sizes of mesh regions of mesh data in this population density data become the same mesh size. The "same mesh size" stated herein means any one of a plurality of mesh sizes calculated through execution of the aforementioned respective processes in the present embodiment and, for example, means the maximum mesh size displayed on the screen. Then the population density data resulting from mapping of this mesh data onto map data is transmitted to the user. This enables the system to meet the user's request to apply the same mesh size to all the mesh sizes of mesh regions.

In the above embodiment, in the continuous display case of population density data, the size determination unit 308 compares plural pieces of mesh data created based on the location information in different time zones and the size adjustment unit 309 adjusts the mesh data so as to equalize the mesh sizes of the respective mesh regions of mesh data at the same location, but the mesh data may also be adjusted, for example, according to a method as described below.

Figure 11:
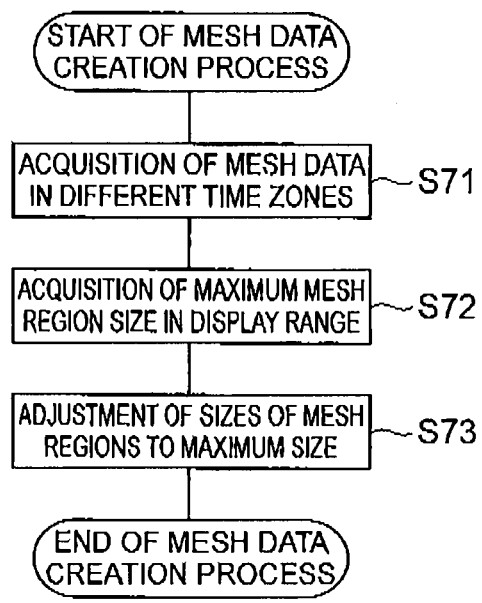
FIG. 11 is a flowchart showing a mesh data creation process in a situation where continuous display of population density data is requested.

Specifically, the method will be described with reference to FIG. 11. FIG. 11 is a flowchart showing the mesh data creation process in the case where continuous display of population density data is requested.

As shown in FIG. 11, pieces of population density data in different time zones are first acquired from the data storage unit 305 and mesh data is acquired from each piece of population density data (step S71). Next, the maximum mesh size in the display range is acquired (step S72). Then the size adjustment unit 309 adjusts the mesh data so that the mesh size of mesh region of each mesh data becomes the maximum mesh size of mesh region (step S73).

The method as described above also allows the user to grasp changes of population densities at a glance in continuous display of data at plural times, by adjusting the mesh data created at different times so that the mesh sizes of respective mesh regions of mesh data at the same location become identical.

Second Embodiment

Next, the mesh creation method according to the second embodiment of the present invention will be described. The mesh creation method according to the second embodiment is different from the first embodiment in that the mesh data is created based on sector information. The same configuration as in the first embodiment will be denoted by the same reference signs, without redundant description thereof.

Figure 12:
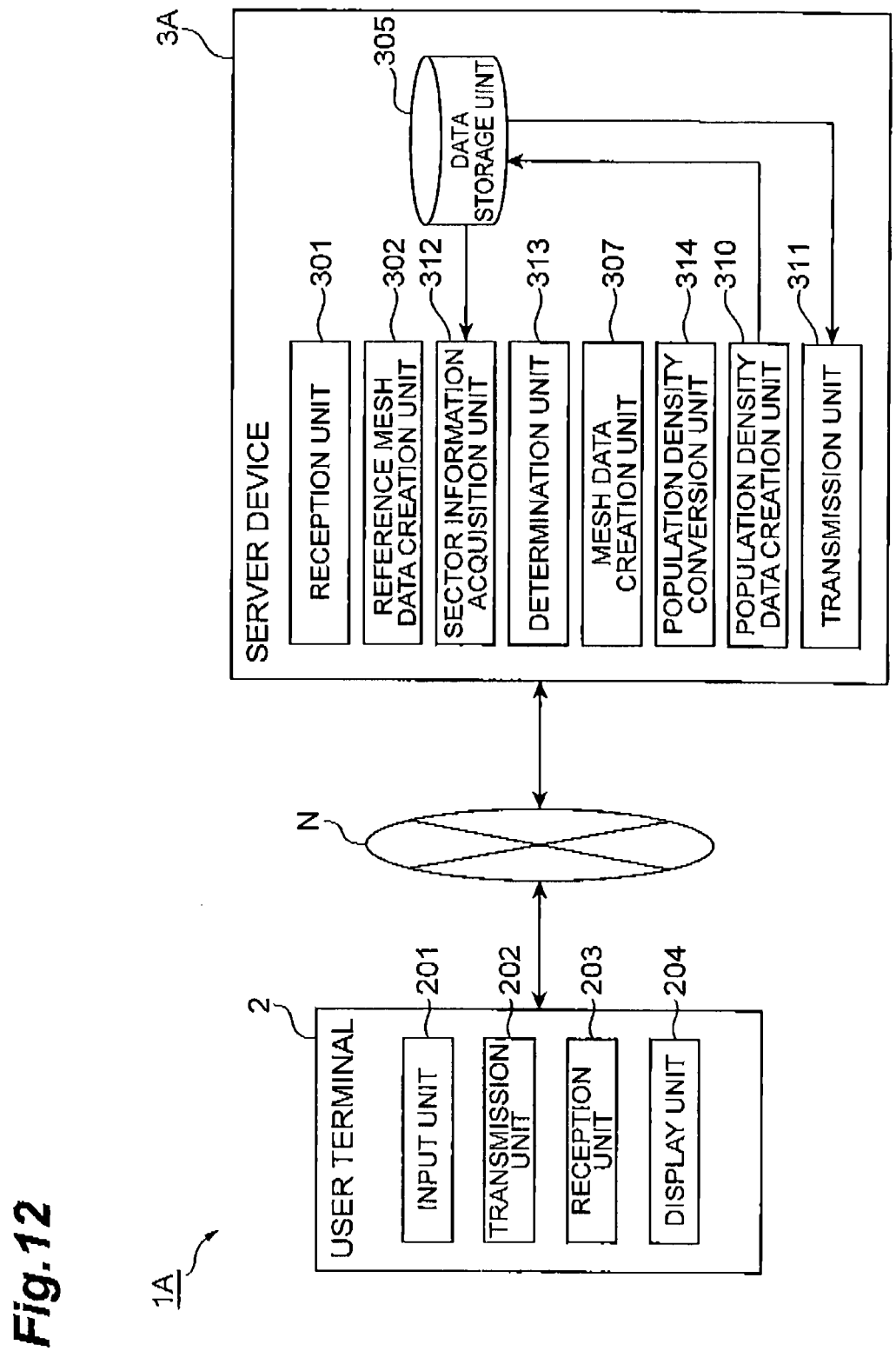
FIG. 12 is a drawing showing a schematic configuration of a mesh data creation system according to the second embodiment.

FIG. 12 is a drawing showing a schematic configuration of a mesh data creation system according to the second embodiment. As shown in FIG. 12, the mesh data creation system 1A is configured including user terminal 2 and server device 3A. The user terminal 2 and server device 3A are connected in a communicable state with each other through a communication network N.

The server device 3A is functionally provided with a sector information acquisition unit 312, a determination unit 313, and a population density conversion unit 314, as a configuration different from the first embodiment.

The sector information acquisition unit 312 is a unit that acquires sector information indicative of locations of sectors. This sector information has population information. When the sector information acquisition unit 312 receives the population density display request information output from the reception unit 301, it acquires the sector information according to this population density display request information from the data storage unit 305. The sector information acquisition unit 312 outputs the acquired sector information to the determination unit 313 and the population density conversion unit 314.

The determination unit 313 is a unit that, when receiving the reference mesh data output from the reference mesh data creation unit 302 and receiving the sector information output from the sector information acquisition unit 312, specifies and counts the number of sectors based on the sector information and determines whether the number of sectors is not less than a threshold in the mesh region of the reference mesh data. The threshold is set, for example, to a value such that the number of sectors in the divided mesh data created by the mesh data creation unit 307 is not 0. When the determination unit 313 determines that the number of sectors is not less than the threshold, it outputs division instruction information to instruct division of the reference mesh data region, to the mesh data creation unit 307. The mesh data creation unit 307 creates divided mesh data, based on the division instruction information output from the determination unit 313.

Figure 13:
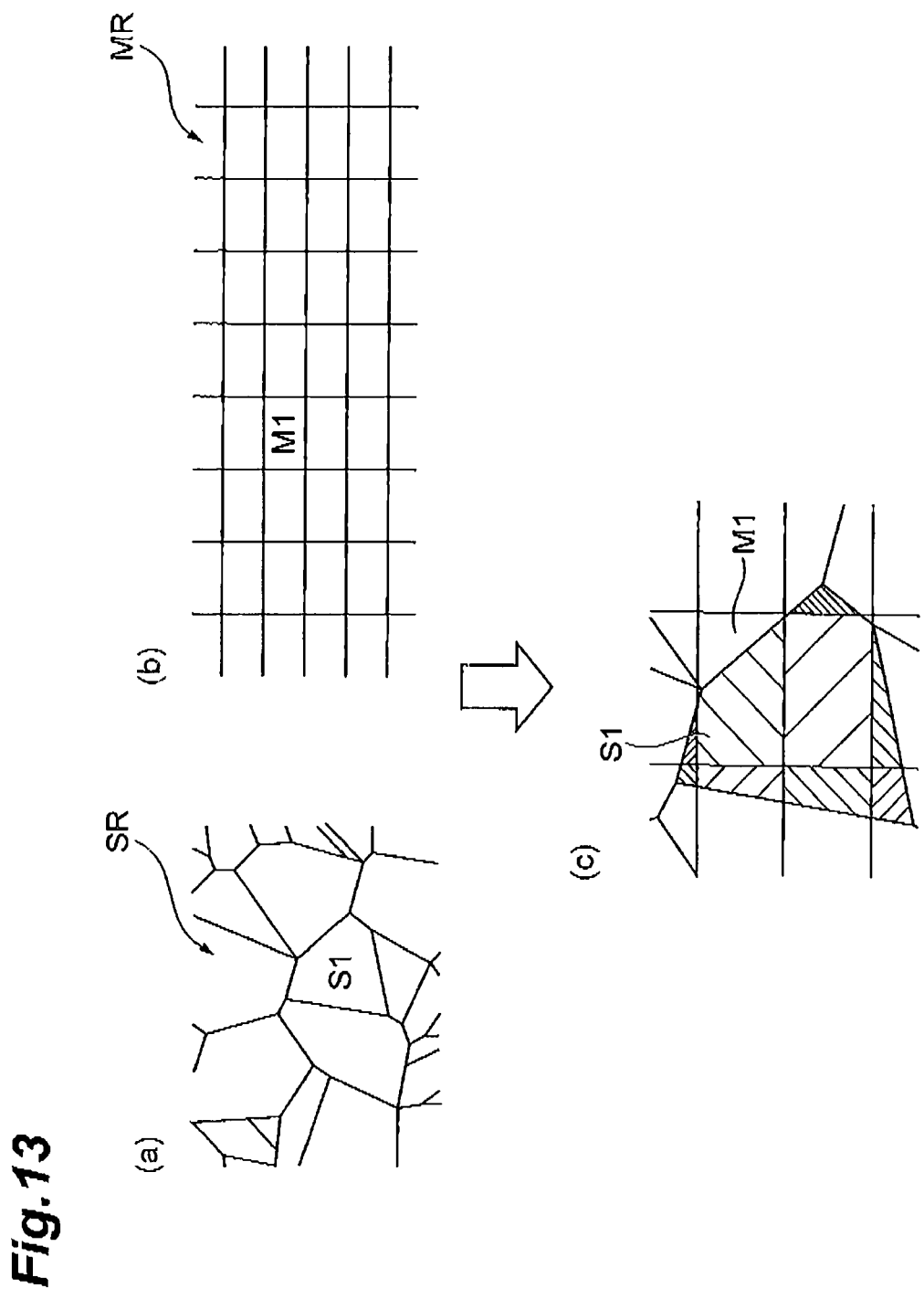
FIG. 13 is a drawing showing sector regions and mesh regions.
Figure 14:
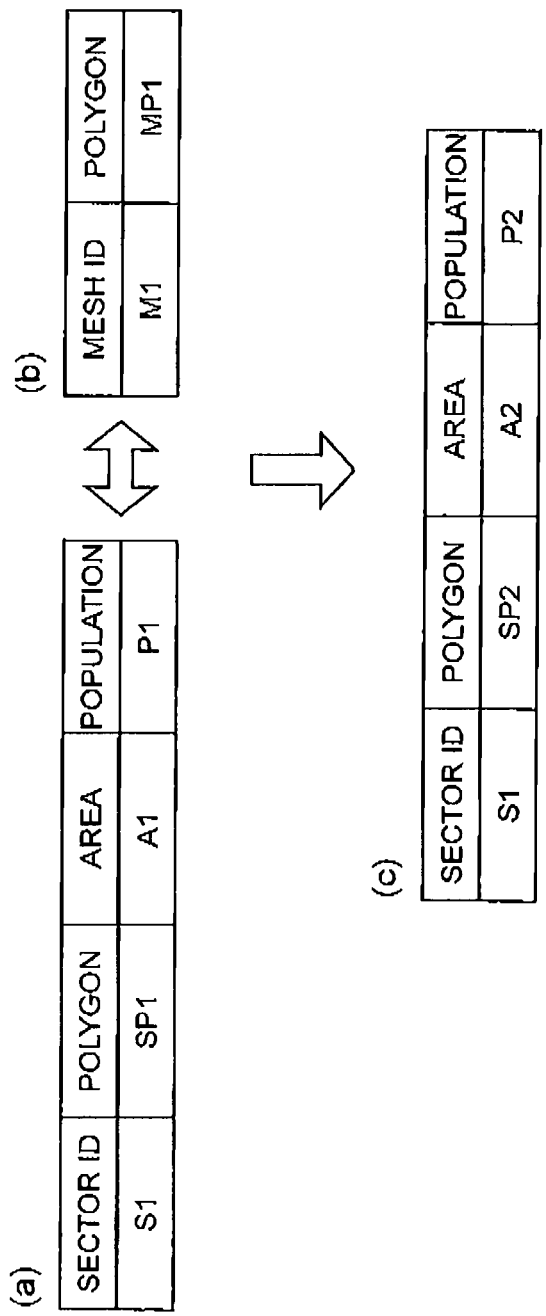
FIG. 14 is a drawing for explaining conversion from population information of sector information to population information of mesh data.

The population density conversion unit 314 assigns the population information of the sector information to the mesh data, thereby converting the population information (population data) of the sector information to population information in the mesh data. Specifically, it will be described with reference to FIGS. 13 and 14. FIG. 13 is a drawing showing sector regions and mesh regions. FIG. 14 is a drawing for explaining the conversion from population information of sector information to population information of mesh data.

FIG. 13(a) shows sector regions indicated in the sector information. As shown in the same drawing, sector regions SR are regions obtained by dividing cells of BTSs (base stations) 30 by predetermined angles and are polygons of polygonal shapes. Each sector region SR is provided with a sector ID (e.g., S1) to identify each sector region. FIG. 13(b) shows mesh regions MR of mesh data. As shown in the same drawing, each mesh region MR is also provided with a mesh ID (e.g., MD) to identify each mesh region.

The population density conversion unit 314 lays the mesh regions MR on the sector regions SR, as shown in FIG. 13(c), to divide the sector regions SR by the mesh regions MR. Then a population density indicated by the population information of each sector region SR is assigned, according to an area ratio divided by a mesh region MR, to the mesh region MR. Then the sum of population information assigned to each mesh region MR is defined as population information of the mesh region MR.

The aforementioned assignment of population information according to the area ratio will be described in further detail with reference to FIGS. 13 and 14. It is assumed as shown in FIG. 13 that one sector ID among the sector regions SR is, for example, S1 and one mesh ID among the mesh regions MR is, for example, M1. It is further assumed that, as shown in FIG. 14(a), the sector region SR with the sector ID of S1 has the polygon (shape) of SP1, the area of A1, and the population of P1 in the population information. It is also assumed that, as shown in FIG. 14(b), the mesh region MR with the mesh ID of M1 has the polygon of MP1.

When the sector region SR and the mesh region MR as described above are superimposed, the polygon of the sector region SR is SP2, as shown in FIG. 14(c). Specifically, the sector region SR is divided by the mesh region MR to deform the shape of the sector region MR. At this time, the area thereof also becomes smaller because of the division by the mesh region MR, e.g., A2. Then, according to this area change, a population assigned to this area also decreases, e.g., to P2. This P2 is a value obtained by (area A2/area A1)×P1. Therefore, the population information of each sector region SR is assigned to the mesh region MR, according to the area ratio resulting from the division by the mesh regions MR. By summing up pieces of population information assigned in this manner, the population information can be given to the mesh regions MR having no population information.

In the mesh data creation method in the mesh data creation system 1A according to the present embodiment, as described above, when the number of samples included in the region of reference mesh data with the predetermined size is not less than the threshold, the divided mesh data is created by dividing the reference mesh data region. Namely, each portion with a large number of sectors can be expressed by a fine region of mesh data and each portion with a small number of sectors by a coarse region of mesh data. Since the reference mesh data region is divided if the number of sectors is not less than the threshold, the regions are prevented from becoming larger than necessary and, particularly, each portion with a large number of sectors can be expressed in detail. As described above, it becomes feasible to prevent the meshes from becoming too fine to ensure accuracy or, conversely, from becoming too coarse to maintain granularity, thereby resulting in failing to achieve a detailed grasp of densities of sectors, and thus to achieve appropriate expression of densities of sectors while making a balance between accuracy and granularity.

Since the population information in sector units is converted into the population information in mesh data region units according to the area ratios of overlap between the sector regions indicated by the sector information with the population information and the mesh data regions, the mesh data can suitably reflect the population information of the sector information.

LIST OF REFERENCE SIGNS

M reference mesh data; MR mesh regions; D divided mesh data; SR sector regions.

The invention claimed is:

1. A mesh data creation method to create mesh data for expression of population densities, comprising:
   a reference mesh data creation step of creating reference mesh data with a predetermined size;
   a location information acquisition step of acquiring location information contained in a region of the reference mesh data created in the reference mesh data creation step;
   a first determination step of specifying a number of samples existing in the region of the reference mesh data, based on the location information acquired in the location information acquisition step, and determining whether the number of samples is not less than a preset threshold;
   a mesh data creation step of creating divided mesh data by dividing the region of the reference mesh data, if it is determined in the determination step that the number of samples is not less than the threshold;
   a size acceptance step of accepting a request to designate a size of the region of the mesh data, from a user;
   a second determination step of determining whether a maximum size of the divided mesh data created in the mesh data creation step satisfies the size of the region requested by the user in the size acceptance step; and
   a duration calculation step of calculating, by processing circuitry, an expanded duration for acquisition of the location information necessary for achieving the size of the region requested by the user in the size acceptance step when a result of the second determination step indicates that the maximum size of the divided mesh data created in the mesh data creation step does not satisfy the size of the region requested by the user in the size acceptance step,
   wherein the location information acquisition step comprises acquiring the location information, according to the expanded duration calculated in the duration calculation step.

2. The mesh data creation method according to claim 1, further comprising:
   a minimum size acceptance step of accepting a request to designate a minimum size of the region of the mesh data, from a user,
   wherein the mesh data creation step comprises creating the divided mesh data so that the region of the reference mesh data is prevented from becoming smaller than the minimum size requested by the user in the minimum size acceptance step.

3. The mesh data creation method according to claim 1, further comprising:
   a size determination step of comparing plural pieces of mesh data created based on the location information in different time zones and determining whether sizes of respective regions of the plural pieces of mesh data at an identical location are identical; and
   a size adjustment step of, if it is determined in the size determination step that the sizes of the respective regions are not identical, adjusting the sizes of the respective regions of the plural pieces of mesh data so as to equalize the sizes of the respective regions of the mesh data in the different time zones.

4. The mesh data creation method according to claim 1, further comprising:
   a size adjustment step of acquiring plural pieces of mesh data created based on the location information in different time zones, and adjusting sizes of respective regions of the plural pieces of mesh data so that the sizes of the respective regions of the plural pieces of mesh data at an identical location become a predetermined size preliminarily set.

5. A mesh data creation method to create mesh data for expression of population densities, comprising:
   a reference mesh data creation step of creating reference mesh data with a predetermined size;
   a location information acquisition step of acquiring location information contained in a region of the reference mesh data created in the reference mesh data creation step;
   a first determination step of specifying a first number of samples existing in the region of the reference mesh data, based on the location information acquired in the location information acquisition step, and determining whether the first number of samples is not less than a preset threshold;
   a first mesh data creation step of creating divided mesh data by dividing the region of the reference mesh data, if it is determined in the first determination step that the first number of samples is not less than the threshold;
   a second determination step of specifying, by processing circuitry, a second number of samples existing in each region of the divided mesh data if the divided mesh data is created, based on the location information acquired in the location information acquisition step, and determining whether the second number of samples is not less than the preset threshold;

a second mesh data creation step of creating mesh data based on the divided mesh data, if it is determined in the second determination step that the second number of samples is less than or equal to the threshold; and a duration acceptance step of accepting a request to designate a duration for acquisition of the location information, from a user, wherein the location information acquisition step comprises acquiring the location information, according to the duration requested by the user in the duration acceptance step.

6. The mesh data creation method according to claim 5, further comprising:

a minimum size acceptance step of accepting a request to designate a minimum size of the region of the mesh data, from a user, wherein the mesh data creation step comprises creating the divided mesh data so that the region of the reference mesh data is prevented from becoming smaller than the minimum size requested by the user in the minimum size acceptance step.

7. The mesh data creation method according to claim 5, further comprising:

a size determination step of comparing plural pieces of mesh data created based on the location information in different time zones and determining whether sizes of respective regions of the plural pieces of mesh data at an identical location are identical; and a size adjustment step of, if it is determined in the size determination step that the sizes of the respective regions are not identical, adjusting the sizes of the respective regions of the plural pieces of mesh data so as to equalize the sizes of the respective regions of the mesh data in the different time zones.

8. The mesh data creation method according to claim 5, further comprising:

a size adjustment step of acquiring plural pieces of mesh data created based on the location information in different time zones, and adjusting sizes of respective regions of the plural pieces of mesh data so that the sizes of the respective regions of the plural pieces of mesh data at an identical location become a predetermined size preliminarily set.

9. A mesh data creation method to create mesh data for expression of population densities, comprising:

a reference mesh data creation step of creating reference mesh data with a predetermined size;

a sector information acquisition step of acquiring sector information indicative of locations of sectors in a region of the reference mesh data created in the reference mesh data creation step, wherein the sectors are regions obtained by dividing cell areas of base stations by predetermined angles;

a determination step of specifying a number of sectors existing in the region of the reference mesh data, based on the sector information acquired in the sector information acquisition step, and determining whether the number of sectors is not less than a preset threshold; and a mesh data creation step of creating, by processing circuitry, divided mesh data by dividing the region of the reference mesh data, if it is determined in the determination step that the number of sectors is not less than the threshold.

10. The mesh data creation method according to claim 9, further comprising:

a conversion step of converting population information in sector units to population information in region units of the mesh data, according to an area ratio of overlap between a sector region indicated in the sector information with population information and the region of the mesh data.

* * * * *